Aug. 13, 1963     A. O. RADKE ETAL     3,100,617
VEHICLE SEAT FORE AND AFT SHOCK ISOLATOR
Filed July 22, 1960     2 Sheets-Sheet 1

INVENTORS
ARTHUR O. RADKE
HARVEY N. TENGLER
BY John W. Michael
ATTORNEY

Aug. 13, 1963  A. O. RADKE ETAL  3,100,617
VEHICLE SEAT FORE AND AFT SHOCK ISOLATOR
Filed July 22, 1960  2 Sheets-Sheet 2

INVENTORS
ARTHUR O. RADKE
HARVEY N. TENGLER
BY John W. Michael
ATTORNEY

United States Patent Office 3,100,617
Patented Aug. 13, 1963

3,100,617
VEHICLE SEAT FORE AND AFT SHOCK ISOLATOR
Arthur O. Radke, Wauwatosa, and Harvey N. Tengler, West Allis, Wis., assignors to Bostrom Manufacturing Company, Milwaukee, Wis., a corporation of Wisconsin
Filed July 22, 1960, Ser. No. 44,791
7 Claims. (Cl. 248—430)

This invention relates to a vehicle seat support which isolates the vehicle seat from fore and aft shocks. Such supports are not broadly new but the structures heretofore proposed have generally located the isolation mechanism directly under the seat. With the advent of the cab-over-engine truck there has developed a serious limitation on the vertical height available for the seat. Thus, the seat has to be held as close as possible to the floorboards. Obviously with the fore and aft isolation gear located under the seat, the seat cannot be dropped.

The principal object of this invention is to locate the fore and aft isolation mechanism within the side rails of the seat support and to keep the area below the seat proper as clear as possible to thus permit the seat pan to be dropped into the space between the side rails and gain an inch or so of cushion depth while remaining within the overall height limitations imposed by the space.

Another object of the invention is to provide a vehicle seat with a fore and aft isolation mechanism which permits fore and aft adjustment of the seat position. While this fore and aft adjustment is a desirable feature to accommodate drivers of different size a number of prior art proposals could not give this feature.

Other objects and advantages will be pointed out in or be apparent from the single embodiment of this invention shown in the drawings in which.

The right and left hand rails of this device are similar, with exceptions noted below, and therefore a single rail is described and like reference numerals apply to like parts of the rails.

Figure 1:
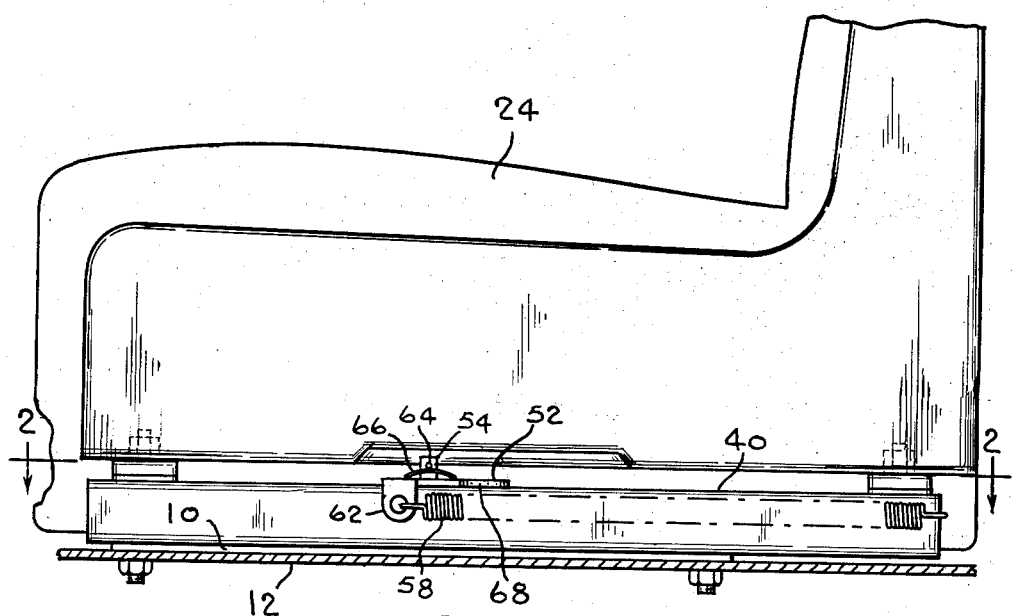
FIG. 1 is a side view of a vehicle seat mounted on the fore and aft isolator of this invention.
Figure 4:
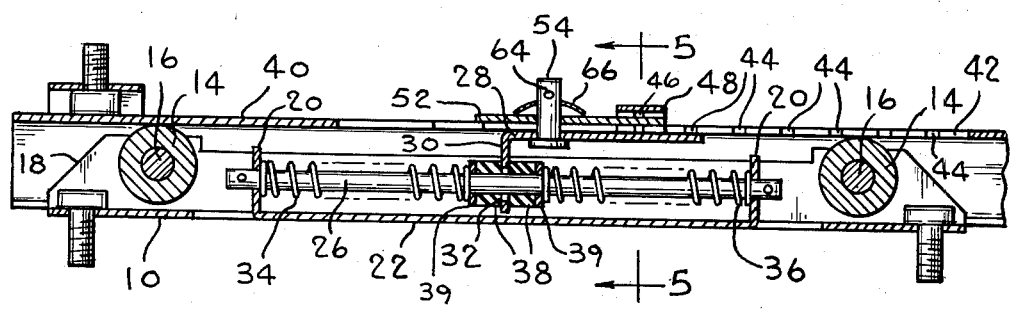
FIG. 4 is a side sectional view taken on line 4—4 in FIG. 2.

Referring to the drawings, a lower rail or channel 10 is secured to the floor 12 of a vehicle body (or to additional mechanism providing vertical shock isolation if desired). Vertical load bearing rollers 14 are rotatably mounted on cross pins 16 between sides 18 of the bottom rail to support upper rail 40, and beveled rollers 19 are journaled on cross pins 16 outside the bottom rail sides to run in the carriage 40 the bottom edges of which are bent inwardly to cooperate with the beveled rollers to restrain upward movement of the carriage. Seat 24 is secured to the carriage. Tabs 20 are bent up from the bottom web 22 of the rail and apertured to receive a guide rod 26.

A latch plate 28 has a depending portion 30 with an opening 32 therein through which guide rod 26 passes. Latch plate 28 is effectively connected to the vehicle seat when the adjusting mechanism (described below) is set, and tabs 20 are fixed with respect to the vehicle body. A compression spring 34 fits around the guide rod between one tab 20 and latch portion 30, and a compression spring 36 fits around the rod between the other tab 20 and latch portion 30 and the rod is secured between tabs 20. With this construction, shocks normally tending to throw a passenger forward are absorbed to a large degree in spring 34 and shocks in the opposite direction are similarly absorbed by spring 36. Rubber bushings 38 are mounted on the guide rod between latch portion 30 and the spring to facilitate lateral pivoting of the latch plate on pin 54 with respect to the guide rod during the adjusting operation (described below). Opening 32 in latch portion 30 is oversize to permit lateral movement of the latch with respect to rod 26. Metal washers 39 are mounted between the ends of the compression springs and the bushings to protect the bushings.

Figure 5:
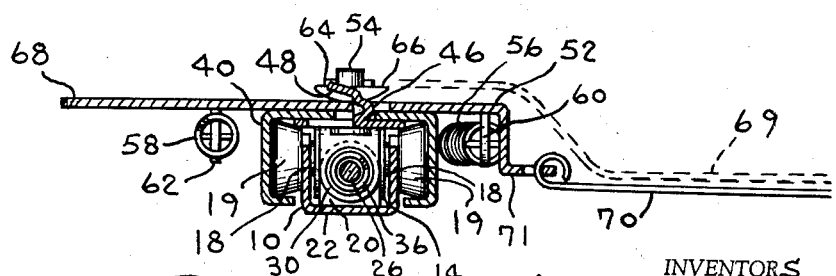
FIG. 5 is a transverse sectional view of a rail taken on line 5—5 in FIG. 4.

It will be appreciated that carriage 40 fits over and around the lower rail so that the above described shock isolating mechanism is completely contained therebetween. This construction is highly compact and requires no mechanism between the rails so that the vehicle seat supporting pan 69 can extend into the space between the rails (as shown in broken lines in FIG. 5). This permits the seat cushion to be lowered, thereby reducing the overall height of the seat. This lower seat construction is especially important in trucks in which the cab is mounted over the engine.

A fore and aft adjusting mechanism may be combined with the fore and aft shock damping mechanism described above. This mechanism includes a longitudinal slot 42 in carriage 40 or upper rail 40 with spaced notches 44 opening off an edge of the slot. A nib 46 is carried by an upwardly projecting ear 48 on latch plate 28 and engages a notch in the carriage to lock the carriage and seat to the latch plate.

Latch plate ear 48 is received in a notch 50 in release lever 52 and the lever is biased so that an edge of notch 50 presses against ear 48 thereby holding nib 46 in the selected notch 44. Lever 52 is pivotally mounted on pin 54 upon which the latch plate also pivots and tension springs 56 and 58 are each connected at one end to apertured release lever ears 60 and 62, respectively, and to the upper rail at the other end to apply a latch-setting bias to the lever. Release lever 52 is held on pin 54 by a retainer pin 64 passing through a hole in the top of pin 54 and spring washer 66 is stressed between pin 64 and release lever 52.

Figure 2:
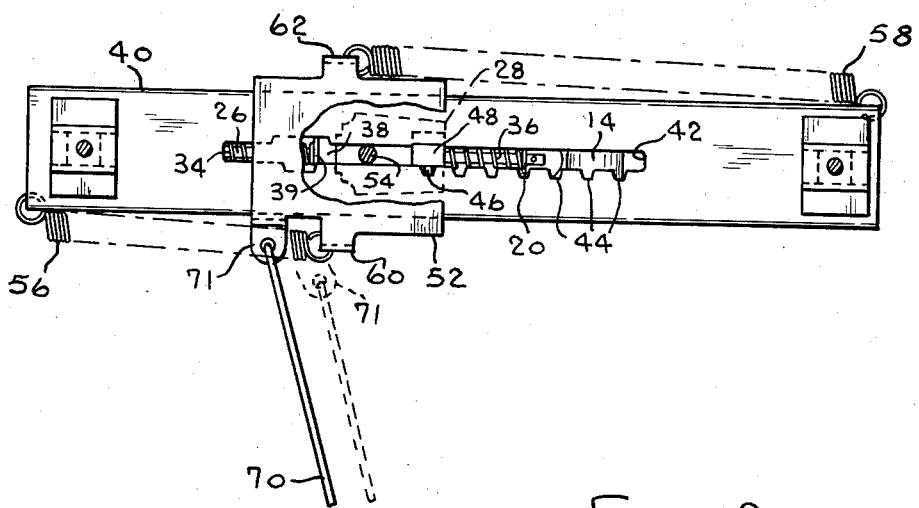
FIG. 2 is a top view of the isolator taken on line 2—2 in FIG. 1 having certain portions broken away and showing the actuated position of portions of the adjusting mechanism in broken lines.
Figure 3:
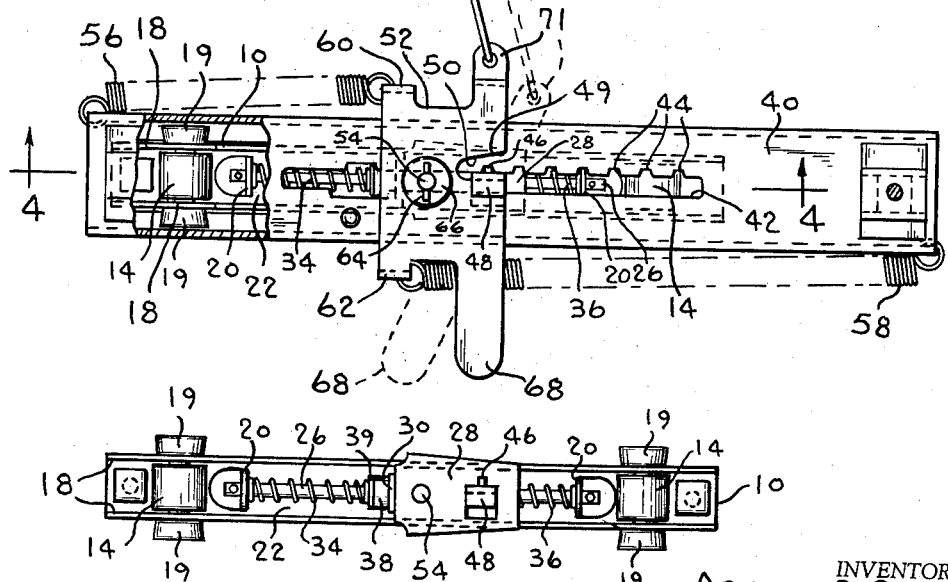
FIG. 3 is a top view of the isolator sub-assembly which is connected directly to the vehicle.

Both the right and left hand rail adjusting mechanisms are identical as described so far. The release levers are the only parts of the adjusting mechanisms which are not similar and these levers differ significantly only in that the left hand lever has a laterally extending adjusting finger 68 which the vehicle driver pulls forward to overcome the tension springs and cause an edge 49 of notch 50 to cam nib 46 out of a notch 44. In order to similarly actuate the latch on the right hand rail, a cross rod 70 is connected between left hand release lever 52 and right hand release lever 52 so that right hand lever 52 is pivoted to disengage the latch plate from the upper rail. Rod 70 is connected between downturned fingers 71 on the adjusting levers so that it extends under seat pan 69. With this construction the bottom of the seat pan can be mounted less than ¼ inch above the floor of the cab beneath the seat and, if rod 70 were connected by a linkage to extend around the seat pan instead of under it, the seat pan could be lowered still further. Portions of levers 52 and rod 70 are shown in broken lines in FIG. 2 in the above described disengaged position. The operator moves the seat to the desired position and releases the adjusting finger. The release lever is then biased into the selected notch by the tension springs, thereby reconnecting the upper rail to the compression spring shock absorbing mechanism. The right hand latch is similarly re-engaged when the tension on cross rod 70 is released by releasing the adjusting finger.

The shock isolation mechanism described above provides the same seat isolating function regardless of the position to which the seat is adjusted. This because the latch is connected to the compression springs and is always biased toward a null point by the springs. Adjusting the carriage can only be accomplished by releasing the latch and when this is done carriage adjustment obviously does not affect the compression springs.

This construction leaves the space between the rails substantially free of mechanism so that the seat may extend therebetween and yet provides adjusting means for the seat. The seat pan can be as close as ¼ inch to the floor boards.

Although but one embodiment of the present invention has been illustrated and described, it will be apparent to those skilled in the art that various changes and modifications may be made therein without departing from the spirit of the invention or from the scope of the appended claims.

We claim:

1. A vehicle seat support comprising a lower rail adapted for connection to a vehicle, an upper rail slidably mounted with respect to the lower rail and defining a central space between the upper and lower rails, load bearing anti-friction means between the upper and lower rails located in said central space, resilient means in the space between the rails for yieldably resisting relative longitudinal movement between the rails, and adjusting means for selectively positioning the upper rail longitudinally with respect to the lower rail without affecting the resilient means.

2. The seat support according to claim 1 in which the resilient means is permanently connected to the lower rail, the adjusting means including latch means connecting the resilient means to the upper rail.

3. The seat support according to claim 1 in which the upper rail includes a longitudinal slot having spaced notches along one edge thereof, latch means fixed to the resilient means in the space between the rails, means normally biasing the latch means into engagement with a notch in the upper rail, and means for overcoming the biasing means to disengage the latch means from the notched upper rail.

4. A seat support according to claim 3 in which the resilient means acts between the lower rail and the latch means whereby adjusting movement of the upper rail does not affect the resilient means.

5. The seat support according to claim 4 in which the resilient means includes a pair of springs acting in opposition and each of which acts between the latch means and the lower rail whereby the latch means is biased to a null point.

6. A seat structure including a pair of supports as defined in claim 1, a seat connected to the upper rails, means interconnecting the adjusting means of each support whereby actuation of one adjusting means will actuate the other, said interconnecting means being positioned below the top of the upper rails, said seat depending into the space between the supports.

7. A seat support as defined in claim 1 in which said anti-friction means comprises, rolling means adapted to bear against one of said rails.

References Cited in the file of this patent
UNITED STATES PATENTS

| | | |
|---|---|---|
| 1,564,978 | Sentrop | Dec. 8, 1925 |
| 3,013,763 | Weberman | Dec. 19, 1961 |